US008743838B2

(12) United States Patent
Gong et al.

(10) Patent No.: US 8,743,838 B2
(45) Date of Patent: Jun. 3, 2014

(54) MILLIMETER-WAVE COMMUNICATION STATION AND METHOD FOR SCHEDULING ASSOCIATION BEAMFORMING TRAINING WITH COLLISION AVOIDANCE

(75) Inventors: Michelle X. Gong, Sunnyvale, CA (US); Carlos Cordeiro, Portland, OR (US)

(73) Assignee: Intel Corporation

( * ) Notice: Subject to any disclaimer, the term of this patent is extended or adjusted under 35 U.S.C. 154(b) by 258 days.

(21) Appl. No.: 12/559,770

(22) Filed: Sep. 15, 2009

(65) Prior Publication Data
US 2011/0064033 A1   Mar. 17, 2011

(51) Int. Cl.
*H04W 4/00*   (2009.01)
(52) U.S. Cl.
USPC .......................................................... 370/334
(58) Field of Classification Search
USPC ......................................... 370/334, 338, 350
See application file for complete search history.

(56) References Cited

U.S. PATENT DOCUMENTS

| | | | |
|---|---|---|---|
| 2007/0230373 | A1 | 10/2007 | Li et al. |
| 2009/0061841 | A1 | 3/2009 | Chaudhri et al. |
| 2009/0061842 | A1 | 3/2009 | Park et al. |
| 2009/0225730 | A1 | 9/2009 | Kesselman et al. |
| 2010/0103045 | A1* | 4/2010 | Liu et al. ....................... 342/372 |
| 2010/0214169 | A1* | 8/2010 | Kafle ............................ 342/368 |

FOREIGN PATENT DOCUMENTS

| | | |
|---|---|---|
| CN | 101416417 A | 4/2009 |
| JP | 2000332667 A | 11/2000 |
| JP | 2007235415 A | 9/2007 |
| JP | 2009044667 A | 2/2009 |
| WO | WO-2010053738 A2 | 5/2010 |
| WO | WO-2011034734 A2 | 3/2011 |

OTHER PUBLICATIONS

"International Application Serial No. PCT/US2010/047532, International Search Report mailed May 25, 2011", 3 pgs.
"International Application Serial No. PCT/US2010/047532, Written Opinion mailed May 25, 2011", 4 pgs.
Lakkis, I., et al., "IEEE802.15.3c Beamforming Overview", IEEE 802.11-09/355r0, (Mar. 12, 2009), 29 pgs.
"Chinese Application Serial No. 201010535330.2, Office Action mailed Jan. 7, 2013", w/English translation, 12 pgs.
"Chinese Application Serial No. 201010535330.2, Office Action mailed Sep. 30, 2013", w/English translation, 7 pgs.
"Chinese Application Serial No. 201010535330.2, Response filed May 22, 2013 to Office Action mailed Jan. 7, 2013", w/English claims, 9 pgs.
"Chinese Application Serial No. 201010535330.2, Response filed Dec. 16, 2013 to Office Action mailed Sep. 30, 2013", w/English claims, 9 pgs.
"Japanese Application Serial No. 2012-529792, Office Action mailed Aug. 20, 2013", w/English translation, 3 pgs.

* cited by examiner

*Primary Examiner* — Mark Rinehart
*Assistant Examiner* — Mohammad Anwar
(74) *Attorney, Agent, or Firm* — John F. Travis

(57) ABSTRACT

Embodiments of a millimeter-wave communication station and method for scheduling association beamforming training (A-BFT) with collision avoidance are generally described herein. In some embodiments an initiating station transmits a transmit sector-sweep frame in each of its antenna sectors and receives a reverse transmit sector-sweep frame from two or more unassociated responding stations. The initiating station transmits a sector-sweep feedback frame to each of the responding stations to indicate whether each responding station is to perform beamforming training in a current beacon interval or a subsequent beacon interval. The sector-sweep feedback frame may indicate an order in which the responding stations are to perform beamforming training in subsequent beacon intervals.

19 Claims, 5 Drawing Sheets

MILLIMETER-WAVE WIRELESS COMMUNICATION NETWORK

ANTENNA SECTORS

PORTION OF AN ANTENNA ARRAY

MILLIMETER-WAVE COMMUNICATION STATION AND METHOD FOR SCHEDULING ASSOCIATION BEAMFORMING TRAINING WITH COLLISION AVOIDANCE

TECHNICAL FIELD

Embodiments pertain to millimeter-wave communication networks. Some embodiments pertain to scheduling association beamforming training (A-BFT) in millimeter-wave communication networks for collision avoidance. Some embodiments pertain to wireless personal area networks (WPANs) that use millimeter-wave frequencies to communicate. Some embodiments relate to millimeter-wave communication networks operating in accordance with standards of the wireless gigabit alliance (WGA).

BACKGROUND

Many conventional wireless networks communicate using microwave frequencies generally ranging between two and ten gigahertz (GHz). These systems generally employ either omnidirectional or low-directivity antennas primarily because of the comparatively long wavelengths of the frequencies used. The low directivity of these antennas limit the throughput of such systems, making applications such as real-time video streaming and high-definition television (HDTV) difficult to implement. The millimeter-wave band has the available spectrum and is capable of providing significantly higher-level throughputs; however, due to higher attenuation levels of millimeter-waves, more directional antennas and beamforming techniques are employed.

One issue with millimeter-wave networks is collisions that occur between communication stations attempting to join the network and perform association beamforming training (A-BFT). Conventionally, when a collision occurs, a station implements a random exponential backoff technique before reattempting the process. This process significantly increases association time when a collision occurs.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1A:
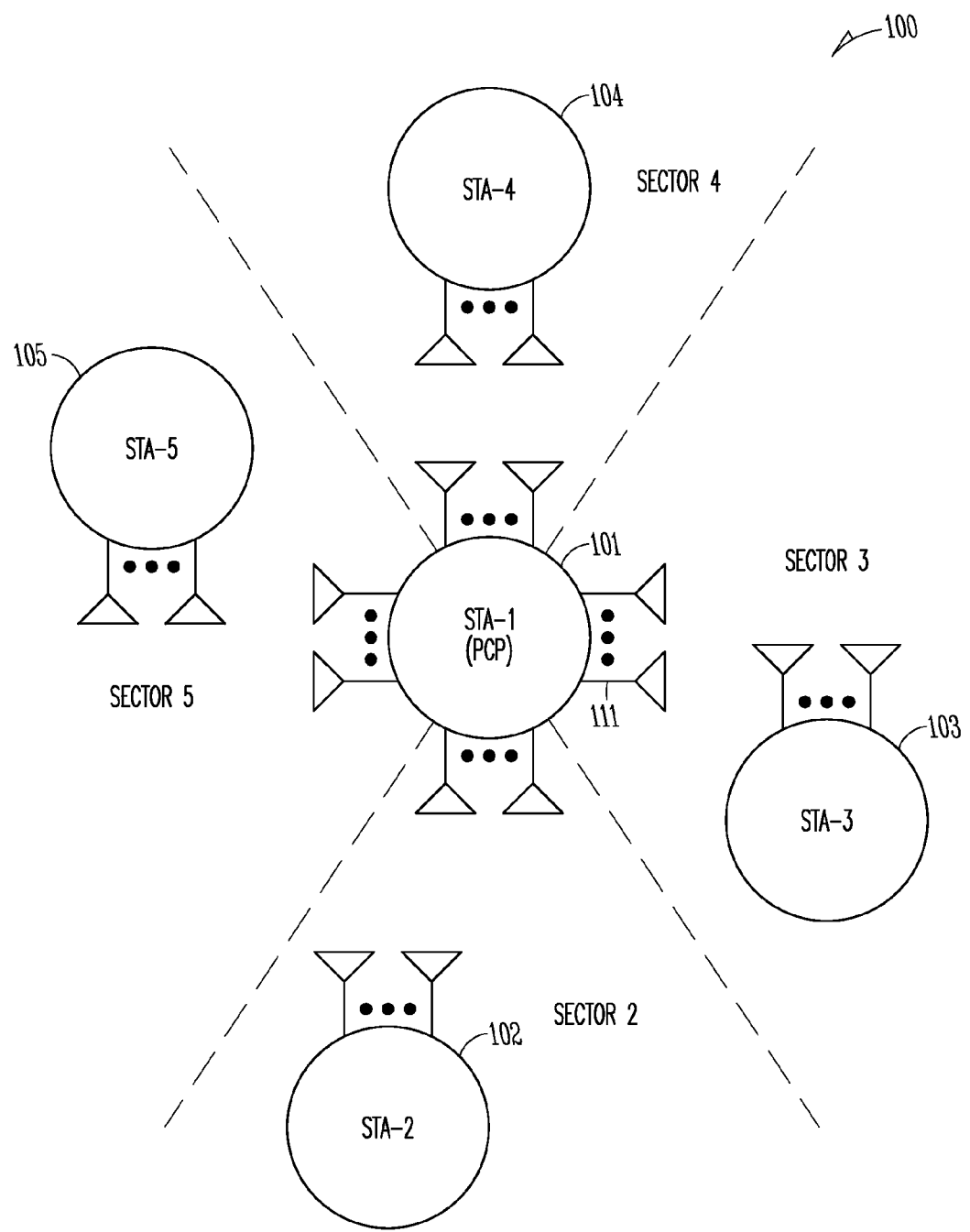
FIG. 1A illustrates a millimeter-wave communication network in accordance with some embodiments.

FIG. 1A illustrates a millimeter-wave communication network in accordance with some embodiments. Millimeter-wave communication network 100 includes a plurality of millimeter-wave communication stations 101-105 that communicate using millimeter waves. One of the stations, such as communication station 101, may act as the network coordinator, or PCP, to coordinate communications among the communication stations 101-105 and control access to the wireless medium. The network coordinator may broadcast a beacon frame that indicates the length of a beacon interval during which communications are to take place. The beacon frame may be received by the other stations 102-105 allowing the other stations 102-105 to know when the next beacon interval will occur. In some embodiments, the next beacon interval may be identified by a beacon transmission.

In accordance with some embodiments, stations 101-105 may utilize a plurality of antennas 111 or antenna elements to allow stations to communicate within one or more antenna sectors. These embodiments are described in more detail below.

In accordance with some embodiments, communication station 101 may act as an initiating station to initiate beamforming training (BFT) by unassociated communication stations, such as stations 102-105, which may be referred to as responding stations. In these embodiments, the initiating station 101 may transmit a transmit sector-sweep frame in each of a plurality of antenna sectors. In response to the transmit sector-sweep frame, the initiating station 101 may receive a reverse transmit sector-sweep frame from two or more of the unassociated responding stations, such as stations 102 and 103. In response to the reverse transmit sector-sweep frames, the initiating station 101 may transmit a sector-sweep feedback frame to each of the responding stations from which the reverse transmit sector-sweep frames were received. The sector-sweep feedback frames indicate whether each responding station (e.g., stations 102 and 103) is to perform beamforming training in a current beacon interval or a subsequent beacon interval. These embodiments are described in more detail below.

Accordingly, a network coordinator, such as the initiating station 101, is able to distinguish reverse transmit sector-sweep frames from different responding stations and can schedule beamforming training for each of these different responding stations in different beacon intervals. Because the initiating station is able to distinguish reverse transmit sector-sweep frames from different responding stations, collisions are reduced, decreasing network association time. In some embodiments, this beamforming training for network association may be referred to as association beamforming training (A-BFT).

FIG. 1A illustrates a simplified example of antenna sectors which are shown as antenna sectors 2 through 5. Although only four antenna sectors are illustrated, the scope of the embodiments is not limited in this respect as many more antenna sectors can be provided. The embodiments illustrated in FIG. 1A may be applicable to switched-beam antennas; however, the scope of the embodiments is not limited in this respect. Other embodiments are applicable to array antennas described in more detail below.

Figure 1B:
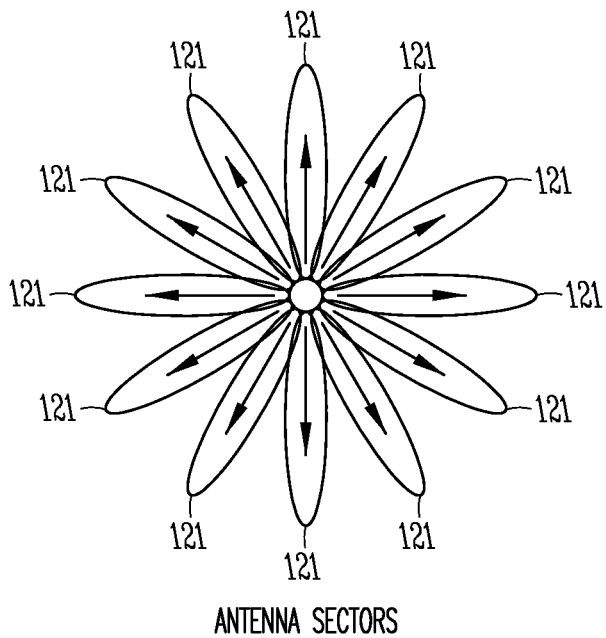
FIG. 1B illustrates a plurality of antenna sectors provided by an array antenna of a millimeter-wave communication station in accordance with some embodiments.

FIG. 1B illustrates a plurality of antenna sectors provided by an array antenna of a millimeter-wave communication station in accordance with some embodiments. In these embodiments, an array antenna may be used by any of communication stations 101-105 (FIG. 1A) to transmit and receive millimeter-wave communication signals within antenna sectors 121.

Figure 1C:
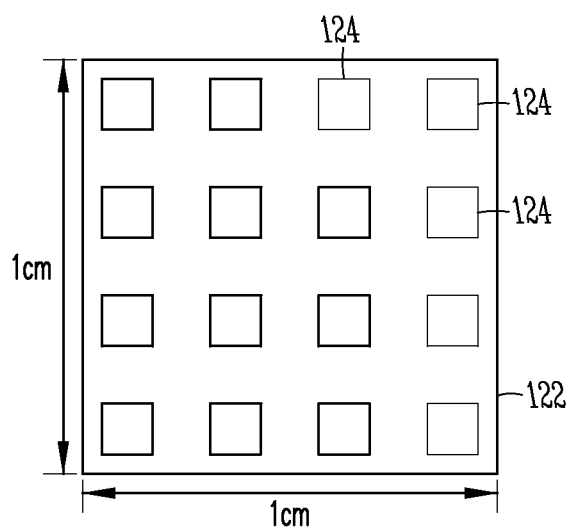
FIG. 1C illustrates a portion of an array antenna in accordance with some embodiments.

FIG. 1C illustrates a portion of an array antenna in accordance with some embodiments. In these embodiments, an array antenna 122 may comprise a plurality of antenna elements 124 configured to transmit and receive millimeter-wave communication signals within antenna sectors 121 (FIG. 1B) through beamforming techniques. In these embodiments, one or more communication stations 101-105 (FIG. 1A) may employ array antenna 122, only a portion of which is illustrated in FIG. 1C.

The plurality of antenna elements 124 may provide a higher gain and allow beam width and beam direction to be controlled by digital signal processing techniques. In these embodiments, the array antenna may operate as a phased array with a predetermined spacing between the antenna elements 124.

In some embodiments, the communication stations 101-105 (FIG. 1A) may utilize one or more array antennas that can be configured to selectively transmit in each antenna sector 121 (FIG. 1B). In some embodiments, an array antenna 122 may comprise at least two antenna elements per antenna sector 121. In other embodiments, the array antenna 122 may comprise up to 64 or more antenna elements configurable to transmit in any one or more of the antenna sectors 121.

In some embodiments, sets of the antenna elements 124 may be positioned to provide the antenna sectors 121. In some embodiments, sets of antenna elements 124 may be provided, for example, in one centimeter square portions as illustrated in FIG. 1C, although this is not a requirement.

Figure 2:
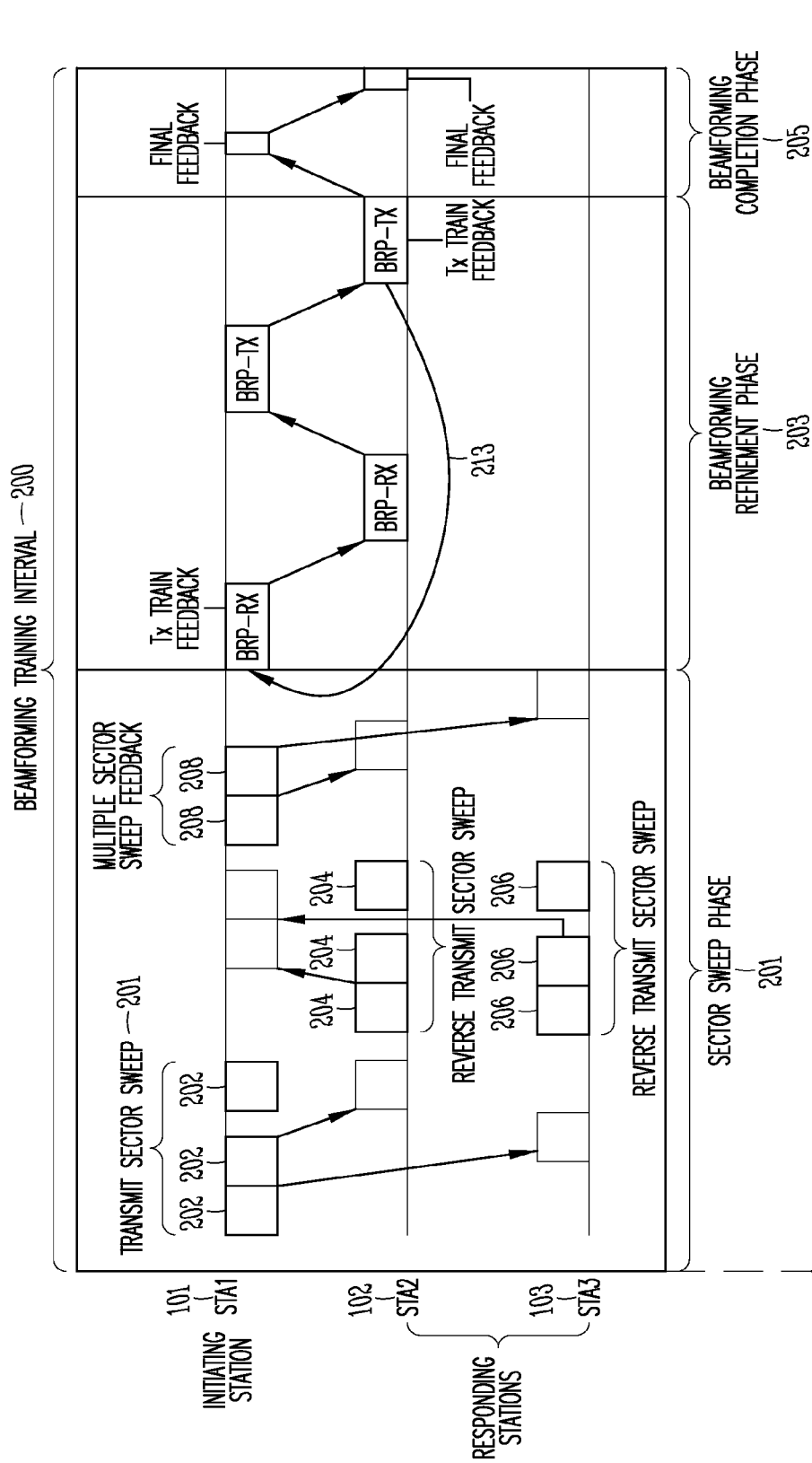
FIG. 2 illustrates a beamforming training interval in accordance with some embodiments.

FIG. 2 illustrates a beamforming training interval in accordance with some embodiments. Beamforming training interval 200 may comprise sector-sweep phase 201, beamforming refinement phase (BRP) 203, and a beamforming completion phase 205. Beamforming training interval 200 may begin at the start of a beacon interval to allow sector-sweep and beamforming refinement operations to be performed during a beacon interval.

In accordance with some embodiments, a process for scheduling association beamforming training (A-BFT) for unassociated stations in a millimeter-wave communication network, such as network 100 (FIG. 1A), is provided. In these embodiments, a transmit sector-sweep frame 202 may be transmitted by the initiating station 101 (STA-1) in each of the antenna sectors, such as antenna sectors 121 (FIG. 1B). A reverse transmit sector-sweep frame 204 may be received from unassociated station 102 (STA-2), and a reverse transmit sector-sweep frame 206 may be received from unassociated responding station 103 (STA-3). The initiating station 101 may transmit a sector-sweep feedback frame 208 to each of the responding stations (i.e., unassociated communication stations 102 and 103) from which the reverse transmit sector-sweep frames 204 and 206 were received. The initiating station 101 may configure the sector-sweep feedback frames 208 to indicate whether each responding station 102 and 103 is to perform beamforming training in a current beacon interval or a subsequent beacon interval.

In some embodiments, after one or more iterations of beamforming training during the beamforming refinement phase 203, the beamforming completion phase 205 may be performed in which the final feedback is exchanged to allow final beamforming coefficients to be determined. After the beamforming completion phase 205, the responding stations 102 and 103 may exchange data frames with the initiating station 101, which may be acting as the network coordinator. Each phase of the beamforming training interval 200 may comprise fixed or predetermined time intervals to allow a station to know when to begin the beamforming refinement phase 203.

As illustrated in FIG. 2, the transmit sector-sweep frames 202 and the sector-sweep feedback frames 208 are transmitted in the current beacon interval. The reverse transmit sector-sweep frames 204 and 206 can be received from two or more unassociated responding stations 102 and 103 in the current beacon interval. The sector-sweep feedback frames 208 may be identical, and a single sector-sweep feedback frame 208 may be transmitted in each antenna sector, such as antenna sectors 121 (FIG. 1B), of the initiating station 101. Accordingly, a sector-sweep feedback frame 208 may be transmitted multiple times.

In some switched-beam antenna embodiments, the initiating station 101 may identify the best antenna sector for the transmission of the sector-sweep feedback frames 208 based on feedback from a responding station. In these embodiments, the sector-sweep feedback frames 208 may be transmitted in each antenna sector from which a reverse transmit sector-sweep frame 204 or 206 was received. For example, sector-sweep feedback frame 208 may be transmitted to responding station 102 within sector 2 (FIG. 1A), and another sector-sweep feedback frame 208 may be transmitted to responding station 103 within sector 3 (FIG. 1A). In some embodiments, responding stations 102 and 103 may embed feedback in their reverse transmit sector-sweep frames 204 and 206 to allow the initiating station 101 to determine to which sectors to send the sector-sweep feedback frames 208.

In some embodiments, in response to receipt of a sector-sweep feedback frames 208, each responding station (102 and 103) may transmit a sector-sweep acknowledgement (SS-ACK) frame (not illustrated in FIG. 2) to the initiating station 101 indicating receipt of the sector-sweep feedback frame 208. The SS-ACK frame may be transmitted during sector sweep phase 201.

In some embodiments, the reverse transmit sector-sweep frames 204 and 206 are transmitted from the unassociated responding stations 102 and 103 in response to their receipt of a transmit sector-sweep frame 202 from the initiating station 101. Transmit sector-sweep frames 202 may be referred to as forward-link transmit sector-sweep frames, and the reverse transmit sector-sweep frames 204 and 206 may be referred to as reverse-link transmit sector-sweep frames.

Although FIG. 2 illustrates that reverse transmit sector-sweep frames (i.e., frames 204 and 206) are received from only two responding stations without collisions, the scope of the embodiments is not limited in this respect as reverse transmit sector-sweep frames may be received from many different responding stations without collisions, allowing beamforming training to be scheduled for many different responding stations.

In some embodiments, the transmit sector-sweep frames 202 may indicate to unassociated stations that the initiating station 101 is the central coordinator for the network 100. The transmit sector-sweep frames 202 may also indicate parameters for communicating with the initiating station 101, including a length of the beacon interval. In some embodiments, the reverse transmit sector-sweep frames 204 and 206 may indicate that unassociated stations may wish to join the network 100 to become associated with the network 100. The reverse transmit sector-sweep frames 204 and 206 may indicate that responding stations, whether they are unassociated or associated with the network 100, wish to perform beamforming training.

A transmit sector sweep 201 may comprise a plurality of transmit sector-sweep frames 202 and may comprise a beacon transmission. The transmit sector-sweep frames 202 may comprise beacon frames.

In some embodiments, the reverse transmit sector-sweep frames 204 and 206 may be received concurrently from the two or more unassociated responding stations 102 and 103. In these embodiments, because the reverse transmit sector-sweep frames 204 and 206 may be received through different sectors, no collision occurs, allowing the initiating station 101 to distinguish between reverse transmit sector-sweep frame 204 and reverse transmit sector-sweep frame 206 received concurrently. The reverse transmit sector-sweep frames 204 and 206 may also be received at different times (as illustrated in FIG. 2) by the initiating station 101 within the sector-sweep phase 201.

In some embodiments, the sector-sweep feedback frame 208 may indicate to the responding stations (e.g., responding stations 102 and 103) during which beacon interval to perform beamforming training (i.e., either in the current beacon interval or in a subsequent beacon interval). The sector-sweep feedback frame 208 may also indicate an order in which the responding stations are to perform beamforming training in the subsequent beacon intervals. These embodiments are described in more detail below.

Figure 3:
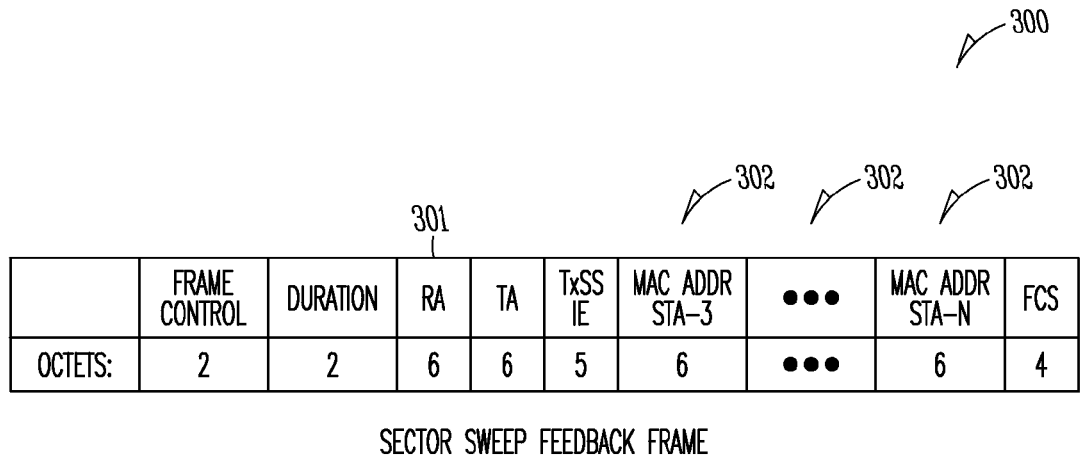
FIG. 3 illustrates an example format of a sector-sweep feedback frame in accordance with some embodiments.

FIG. 3 illustrates an example format of a sector-sweep feedback frame in accordance with some embodiments. Sector-sweep feedback frame 300 may be suitable for use as sector-sweep feedback frame 208 (FIG. 2) and may be transmitted by an initiating station to indicate to two or more responding stations during which beacon interval to perform beamforming training.

Sector-sweep feedback frame 300 includes, among other things, a recipient address (RA) field 301 and a plurality of media-access-control (MAC) address fields 302. The RA field 301 may include the MAC address of the responding station that is to perform beamforming training in the current beacon interval. The MAC address fields 302 may include the MAC addresses of responding stations that are to perform beamforming training in subsequent beacon intervals.

In some embodiments, the order of the MAC addresses in MAC address fields 302 may correspond to the order in which the responding stations are to perform beamforming training in subsequent beacon intervals. For example, sector-sweep feedback frame 208 shows that a responding station with a MAC address of STA-3 is listed first; therefore, that station is to perform beamforming training in the next beacon interval following the current beacon interval. The responding station with a MAC address of STA-4 may be listed in the next MAC address field 302; therefore, that station is to perform beamforming training in the second beacon interval following the current beacon interval. The responding station with a MAC address STA-N may be listed in the $N^{th}$ MAC address field; therefore, that station is to perform beamforming training in the $N^{th}$ beacon interval following the current beacon interval. In these embodiments, there would be no transmit sector-sweeps performed by the initiating station in these subsequent beacon intervals because beam-forming training is already scheduled. As illustrated in FIG. 2, since station 102 (STA-2) performs A-BFT in the current beacon interval (i.e., during beamforming refinement phase 203), station 103 (STA-3) may be scheduled to perform A-BFT in the next beacon interval, which would not include a transmit sector-sweep 211 (FIG. 2) by the initiating station 101.

Referring back to FIG. 2, the receipt of a sector-sweep feedback frame 208 by a responding station indicates to the responding station that the sector sweep phase 201 has been successful and that the responding station may begin the beamforming refinement phase 203 in either the current or a subsequent beacon interval. A responding station that has to wait a long time (i.e., many beacon intervals) before its scheduled beamforming training may choose to re-perform the sector-sweep phase 201. In these situations, since many stations may be attempting to associate at the same time, chances are low that the responding station would be scheduled for beamforming training any sooner, particularly since the radio range of millimeter-waves (e.g., 60 GHz) is approximately 10 feet.

In accordance with some embodiments, when one of the unassociated responding stations (e.g., responding station 103) does not receive a sector-sweep feedback frame 208 in response to transmission of reverse transmit sector-sweep frames 206; the unassociated responding station 103 may assume that a collision has occurred. In these embodiments, the unassociated responding station 103 may randomly select one of its antenna sectors to send a reverse transmit sector-sweep frame 206 during the sector-sweep phase 201 of a subsequent beacon interval. The random selection of an antenna sector introduces randomness in the reverse transmit sector-sweep transmissions, helping to avoid collisions, particularly for unassociated stations with a greater number of antenna sectors. In these embodiments, a reduction in collisions may be achieved without an exponential backoff of a number of beacon intervals after a collision occurs, like in some conventional networks.

In these embodiments, the reverse transmit sector-sweep frame 206 that the station sends in a randomly chosen antenna sector may be sent in response to a transmit sector-sweep frame 202 received in that next beacon interval. This may allow the station to perform beamforming training in the next beacon interval.

In some of these embodiments, an unassociated station with a greater number of antenna sectors (e.g., eight or more) is configured to send the reverse transmit sector-sweep frame 206 in a randomly selected antenna sector in the sector-sweep phase 201 of a next beacon interval. An unassociated station with a lesser number of antenna sectors (e.g., fewer than eight) is configured to delay sending the reverse transmit sector-sweep frame 206 until a later beacon interval that is randomly selected. A station with fewer antenna sectors may backoff a randomly selected amount (i.e., a few) of beacon intervals in addition to randomly selecting an antenna sector to introduce sufficient randomness in the reverse transmit sector-sweep phase.

In some embodiments, the reverse transmit sector-sweep frames 204 and 206 may be transmitted by the responding stations 102 and 103 in each antenna sector of the responding stations. In this way, a reverse transmit sector-sweep covers all antenna sectors of a corresponding station.

In some embodiments, the transmit sector-sweep frames 202 are transmitted by the initiating station 101 sequentially in each antenna sector, although this is not a requirement. In other words, the initiating station 101 may transmit a first transmit sector-sweep frame 202 in a first sector, a second transmit sector-sweep frame 202 the next sector, and so forth. Similarly, the reverse transmit sector-sweep frames 204 and 206, for example, may be transmitted by a responding station sequentially in each of its antenna sectors, although this is not a requirement.

In some embodiments, the transmission of the transmit sector-sweep frame 202, the reception of the reverse transmit sector-sweep frames 204 and 206, and the transmission of the sector-sweep feedback frames 208 are performed during the sector sweep phase 201 of the current beacon interval. A-BFT may be performed with one of the responding stations (i.e., responding station 102) identified first in the sector-sweep feedback frame 208 during the beamforming refinement phase 203 of the current beacon interval. A-BFT may be performed with a second of the responding stations (i.e., responding station 103) identified second in the sector-sweep feedback frame 208 during a beamforming refinement phase 203 of the next beacon interval.

In some embodiments, performing beamforming training comprises transmitting and receiving training sequences, and providing feedback to determine antenna weights for the array antennas of the initiating and responding stations. During the beamforming refinement phase 203, a station may transmit and receive training sequences in order to train the array antenna. In some embodiments, the receiver is trained first and then the transmitter is trained. One or more iterations may be performed to determine initial antenna weight vectors and to progressively adjust the antenna weight vectors until a predetermined signal quality between two stations is achieved. In these embodiments, a closed-loop feedback process may be performed in which channel measurements are fed back to the transmitting station to allow the transmitter to weigh the antenna elements. In some embodiments, the closed-loop feedback process may include sending weights to the transmitting station. In some embodiments, this beamforming training process may be iterated as indicated by arrow 213.

In some embodiments, prior to transmitting the transmit sector-sweep frames 202, the initiating station 101 configures its array antenna to transmit one transmit sector-sweep frame 202 separately in each of its antenna sectors 121 (FIG. 1B).

Figure 4:
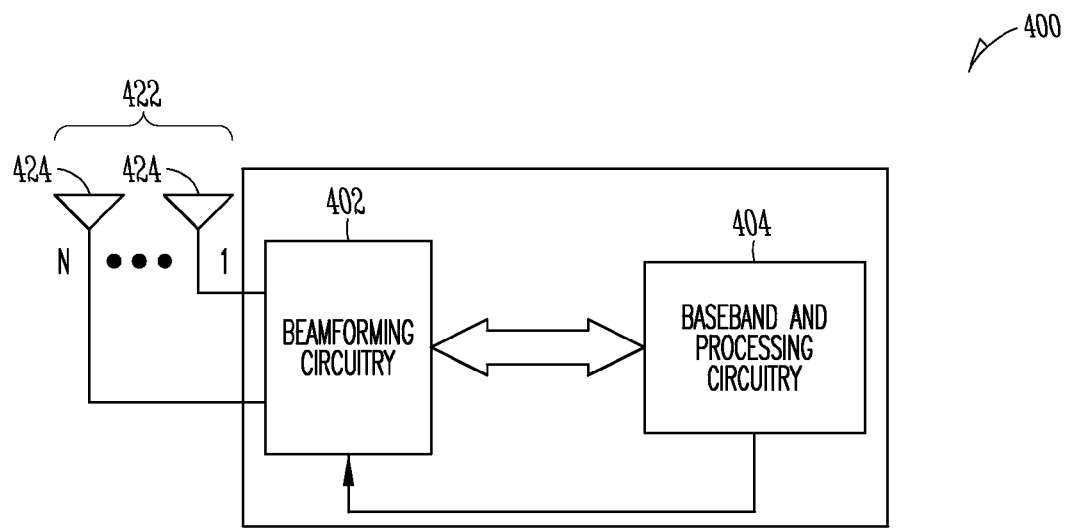
FIG. 4 is a block diagram of a millimeter-wave communication station in accordance with some embodiments.

FIG. 4 is a block diagram of a millimeter-wave communication station in accordance with some embodiments. Millimeter-wave wireless communication station 400 may include, among other things, an array antenna 422, beamforming circuitry 402 and baseband and processing circuitry 404. Millimeter-wave wireless communication station 400 may be suitable for use as any one or more of millimeter-wave wireless communication stations 101-105 illustrated in FIG. 1A and discussed in FIGS. 2-4. Array antenna 422 may include a plurality of antenna elements 424 and may be configured to communicate in a plurality of antenna sectors such as antenna sectors 121 (FIG. 1B). Antenna elements 424 may correspond to antenna elements 124 (FIG. 1C). In some alternate embodiments, millimeter-wave wireless communication station 400 may utilize a switched-beam antenna.

In accordance with embodiments, beamforming circuitry 402 may configure array antenna 422 to transmit the transmit sector-sweep frame 202 (FIG. 2) in each of a plurality of antenna sectors and to receive the reverse transmit sector-sweep frames (e.g., frames 204 and 206 (FIG. 2)) from two or more unassociated responding stations. Baseband and processing circuitry 404 may generate the sector-sweep feedback frame 208 (FIG. 2) for transmission to each of the responding stations from which the reverse transmit sector-sweep frames were received. Baseband and processing circuitry 404 may configure the sector-sweep feedback frames 208 to indicate whether each responding station is to perform beamforming training in a current beacon interval or a subsequent beacon interval. In some embodiments, baseband and processing circuitry 404 may configure the sector-sweep feedback frames 208 in accordance with the example format illustrated in FIG. 3.

Millimeter-wave wireless communication station 400 may include other circuitry for communicating millimeter-wave wireless communication signals, including 60 Gigahertz (GHz) wireless technologies. In some embodiments, millimeter-wave wireless communication station 400 can be used to provide a flexible interface that can be efficiently embedded into home media gateways, cell phones, flat panel TVs, set-top boxes, Blu-ray players, digital cameras, PCs, laptops, and many other multimedia and communication devices. Although millimeter-wave wireless communication station 400 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, application specific integrated circuits (ASICs), radio-frequency integrated circuits (RFICs) and combinations of various hardware and logic circuitry for performing at least the functions described herein. In some embodiments, the functional elements of millimeter-wave wireless communication station 400 may refer to one or more processes operating on one or more processing elements.

Figure 5:
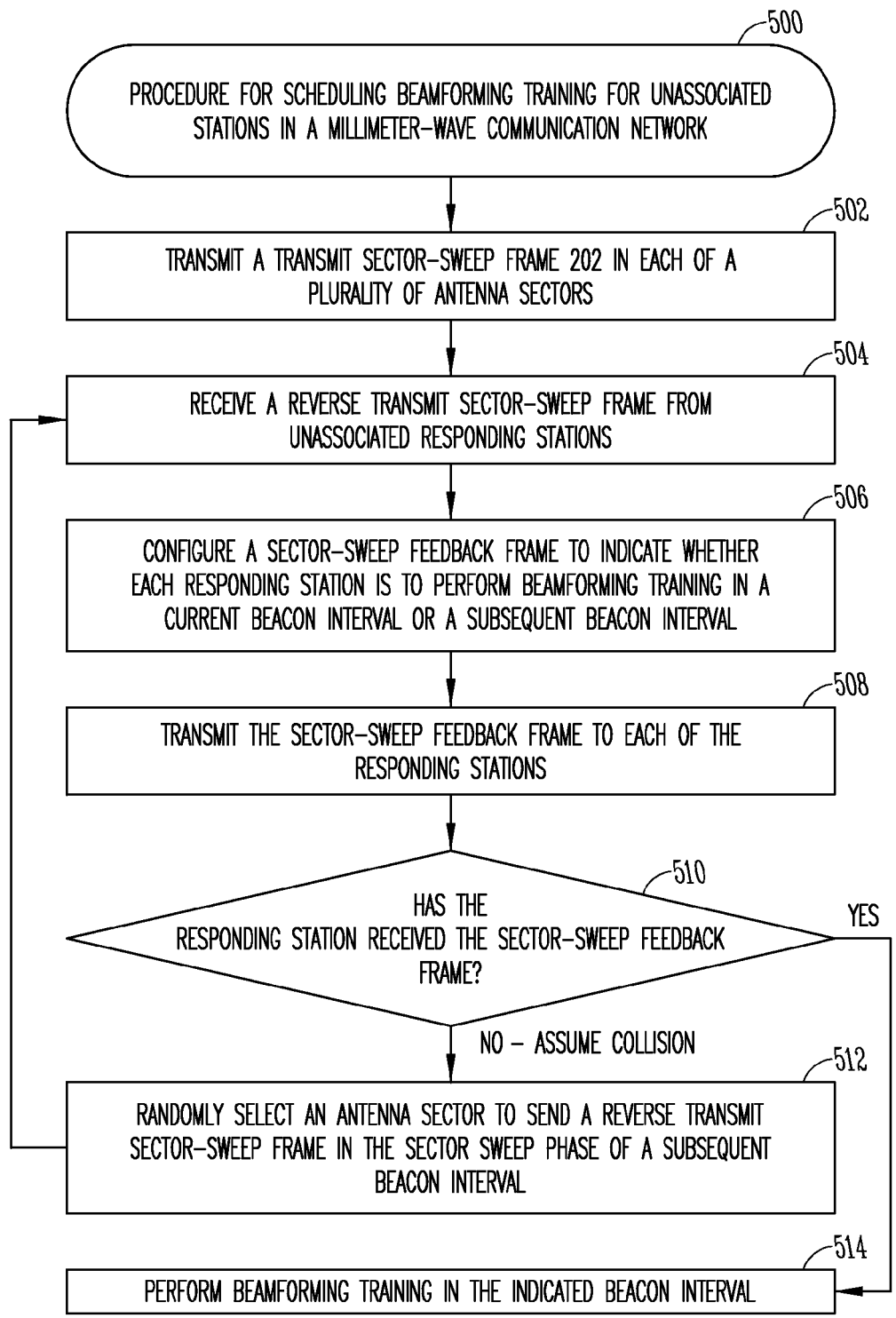
FIG. 5 is a procedure for scheduling beamforming training for unassociated stations in accordance with some embodiments.

FIG. 5 is a procedure for scheduling beamforming training for unassociated stations in accordance with some embodiments. Procedure 500 may be performed by millimeter-wave communication stations, such as millimeter-wave communication stations 101-105 (FIG. 1). Portions of procedure 500 may be performed by an initiating station and other portions of procedure 500 may be performed by responding stations. Procedure 500 may be performed to schedule A-BFT for stations wishing to associate with a millimeter-wave communication network.

In operation 502, a transmit sector-sweep frame 202 (FIG. 2) is transmitted by an initiating station in each of a plurality of its antenna sectors.

In operation 504, reverse transmit sector-sweep frames 204 and 206 (FIG. 2) may be received from two or more unassociated responding stations.

In operation 506, the initiating station may configure a sector-sweep feedback frame 300 (FIG. 3) to indicate whether each responding station is to perform beamforming training in a current beacon interval or a subsequent beacon interval.

In operation 508, the initiating station may transmit the sector-sweep feedback frame 208 (FIG. 2) to each of the responding stations from which the reverse transmit sector-sweep frames were received. In some embodiments, the initiating station may transmit the sector-sweep feedback frame in each of its antenna sectors.

In operation 510, a responding station determines whether or not it has received a sector-sweep feedback frame 208 in response to a reverse transmit sector-sweep frame. When the responding station determines that it has not received a sector-sweep feedback frame 208, a collision may have occurred and operation 512 is performed. When the responding station determines that it has received a sector-sweep feedback frame 208, operation 514 is performed.

In operation 512, the responding station may randomly select an antenna sector to send a reverse transmit sector-sweep frame in the sector-sweep phase 201 (FIG. 2) of a subsequent beacon interval. Operations 504 through 510 may be re-performed to begin the A-BFT process.

In operation 514, the responding station performs A-BFT in the beacon interval indicated in the sector-sweep feedback frame 208.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. A method performed by an initiating station for scheduling association beamforming training (A-BFT) for unassociated stations in a millimeter-wave communication network, the method comprising:
   transmitting a transmit sector-sweep frame in each of a plurality of antenna sectors;
   receiving a reverse transmit sector-sweep frame from two or more unassociated responding stations; and
   transmitting a sector-sweep feedback frame to each of the responding stations from which the reverse transmit sector-sweep frames were received,
   wherein the sector-sweep feedback frames indicate whether each responding station is to perform beamforming training in a current beacon interval or a subsequent beacon interval;
   further wherein the sector-sweep feedback frame indicates an order in which the responding stations are to perform beamforming training in subsequent beacon intervals.

2. The method of claim 1 wherein the transmit sector-sweep frames and the sector-sweep feedback frames are transmitted in the current beacon interval, and
   wherein the reverse transmit sector-sweep frames are received from the two or more unassociated responding stations in the current beacon interval.

3. The method of claim 2 wherein the sector-sweep feedback frames are identical and a single sector-sweep feedback frame is transmitted in each antenna sector of the initiating station.

4. The method of claim 2 wherein when one of the unassociated responding stations does not receive a sector-sweep feedback frame, the unassociated responding station assumes a collision has occurred and is configured to:
   randomly select an antenna sector to send a reverse transmit sector-sweep frame in a sector-sweep phase of a subsequent beacon interval.

5. The method of claim 4 wherein an unassociated station with a greater number of antenna sectors is configured to send the reverse transmit sector-sweep frame in the sector-sweep phase of a next beacon interval and
   wherein an unassociated station with a lesser number of antenna sectors is configured to delay sending the reverse transmit sector-sweep frame until a later beacon interval that is randomly selected.

6. The method of claim 2 wherein the initiating station comprises a switched-beam antenna,
   wherein the initiating station identities an antenna sector within which each of the responding stations are located based on the receipt of the reverse transmit sector-sweep frame, and
   wherein one sector-sweep feedback frame is transmitted in each antenna sector identified to be associated with one of the responding stations.

7. The method of claim 2 wherein the reverse transmit sector-sweep frames are transmitted by the responding stations in each antenna sector of the responding stations.

8. The method of claim 1 wherein the sector-sweep feedback frame includes a plurality of media-access-control (MAC) address fields to indicate the order in which the responding stations are to perform beamforming training in the current and subsequent beacon intervals.

9. The method of claim 8 wherein the sector-sweep feedback frame further comprises:
   a recipient address field; wherein;
   the recipient address field comprises the MAC address of the responding station that is to perform beamforming training in the current beacon interval; and further wherein
   the plurality of MAC address fields include the MAC addresses of responding stations to perform beamforming training in subsequent beacon interval.

10. The method of claim 1 wherein the transmission of the transmit sector-sweep frame, the reception of the reverse transmit sector-sweep frames, and the transmission of the sector-sweep feedback frames are performed during a sector-sweep phase of the current beacon interval, and
    wherein the method further comprises:
       performing the beamforming training with one of the responding stations identified first in the sector-sweep feedback frame during a beamforming refinement phase of the current beacon interval; and
       performing the beamforming training with a second of the responding stations identified second in the sector-sweep feedback frame during a beamforming refinement phase of a next beacon interval.

11. The method of claim 1 further comprising:
    configuring an array antenna to transmit one of the transmit sector-sweep frames in each of the antenna sectors, and
    configuring the array antenna to transmit the sector-sweep feedback frame in each of the antenna sectors.

12. A millimeter-wave wireless communication station comprising:
    beamforming circuitry to configure an array antenna to transmit a transmit sector-sweep frame in each of a plurality of antenna sectors and to receive a reverse transmit sector-sweep frame from two or more unassociated responding stations;
    baseband and processing circuitry to configure a sector-sweep feedback frame for transmission to each of the responding stations from which the reverse transmit sector-sweep frames were received,
    wherein the sector-sweep feedback frames indicate whether each responding station is to perform beamforming training in a current beacon interval or a subsequent beacon interval.

13. The millimeter-wave wireless communication station of claim 12 wherein the sector-sweep feedback frame indicates to the responding stations in which beacon interval to perform beamforming training.

14. The millimeter-wave wireless communication station of claim 12 wherein the sector-sweep feedback frame indicates an order in which the responding stations are to perform beamforming training in subsequent beacon intervals.

15. The millimeter-wave wireless communication station of claim 12 wherein the beamforming circuitry is configured to:
    configure an array antenna to transmit one of the transmit sector-sweep frames in each of the antenna sectors, and
    configure the array antenna to transmit the sector-sweep feedback frame in each of the antenna sectors.

16. The millimeter-wave wireless communication station of claim 12 wherein when one of the unassociated responding stations does not receive a sector-sweep feedback frame, the unassociated responding station assumes a collision has occurred and is configured to randomly select an antenna sector to send a reverse transmit sector-sweep frame in a sector- sweep phase of a subsequent beacon interval.

17. A millimeter-wave communication station configured to perform association beamforming training (AB FT)in a millimeter-wave communication network, the millimeter-wave communication station comprising:
    a transceiver arranged o transmit a reverse transmit sector-sweep frame to an initiating station in response to a transmit sector-sweep frame from an initiating station;
    wherein the transceiver is further arranged to receive a sector-sweep feedback frame in response to the reverse transmit sector-sweep frame, the sector-sweep feedback frame indicating to each of a plurality of responding stations whether to perform beamforming training in a current beacon interval or a subsequent beacon interval; and wherein the transceiver is further arranged to perform A-BFT with the initiating station in either the current beacon interval or a subsequent beacon interval as indicated in the sector-sweep feedback frame.

18. The millimeter-wave communication station of claim 17 wherein the transmit sector-sweep frames and the sector-sweep feedback frames are transmitted b r the initiating station in the current beacon interval, and wherein the reverse transmit sector-sweep frames are received from two or more unassociated responding stations in the current beacon interval.

19. The millimeter-wave communication station of claim 17 wherein when the millimeter-wave communication station does not receive the sector-sweep feedback frame, an unassociated responding station is configured to assume a collision has occurred and randomly select an antenna sector to send a reverse transmit sector-sweep frame in a sector-sweep phase of a subsequent beacon interval.

* * * * *